United States Patent
Flake et al.

(10) Patent No.: US 7,065,613 B1
(45) Date of Patent: Jun. 20, 2006

(54) METHOD FOR REDUCING ACCESS TO MAIN MEMORY USING A STACK CACHE

(75) Inventors: Lance Flake, Longmont, CO (US); Andrew Vogan, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 191 days.

(21) Appl. No.: 10/457,080

(22) Filed: Jun. 6, 2003

Related U.S. Application Data

(60) Provisional application No. 60/387,115, filed on Jun. 6, 2002.

(51) Int. Cl.
  *G06F 12/00* (2006.01)
(52) U.S. Cl. .................. 711/132; 711/136; 711/144
(58) Field of Classification Search ................ 711/132, 711/136, 144
  See application file for complete search history.

(56) References Cited

U.S. PATENT DOCUMENTS

| 5,893,121 A | 4/1999 | Ebrahim et al. ............. 707/206 |
| 5,930,820 A | 7/1999 | Lynch ......................... 711/132 |
| 6,038,643 A * | 3/2000 | Tremblay et al. ........... 711/132 |
| 6,151,661 A | 11/2000 | Adams, III et al. ......... 711/132 |

* cited by examiner

*Primary Examiner*—Mano Padmanabhan
*Assistant Examiner*—Craig E Walter
(74) *Attorney, Agent, or Firm*—Tejpal S. Hansra

(57) ABSTRACT

The invention is directed to efficient stack cache logic, which reduces the number of accesses to main memory. More specifically, in one embodiment, the invention prevents writing old line data to main memory when the old line data represents a currently unused area of the cache. In another embodiment, the invention prevents reading previous line data for a new tag from main memory when the new tag represents a currently unused area of the cache.

20 Claims, 4 Drawing Sheets

CACHE STRUCTURE

STACK MEMORY ADDRESSES

FIG. 6

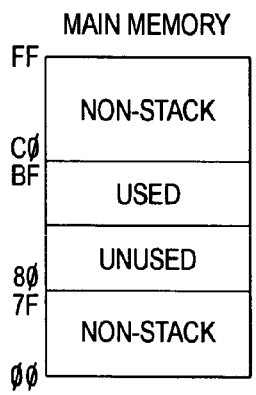

MAIN MEMORY
- FF
- C0 — NON-STACK
- BF ← CEILING = BF
- USED
- ← STACK POINTER
- UNUSED
- 80 ← FLOOR = 80
- 7F — NON-STACK
- 00

STACK CACHE

| LINES | D | V | TAG | 3 | 2 | 1 | 0 |
|---|---|---|---|---|---|---|---|
| 1 | 1 | 1 | 0 0 0 0 0 | | | | |
| 0 | 1 | 1 | 1 0 1 0 0 | | | | |

INITIAL STATE:
    STACK POINTER = A0
    LINE 0 : A0 - A3 DIRTY STACK
    LINE 1 : 04 - 07 DIRTY NON-STACK

1. NEW WRITE 9F
   1a. WRITES 04 - 07 TO MAIN MEMORY
   1b. SKIPS READ 9C - 9F
2. SET STACK POINTER = 9F

| | | | | | | | |
|---|---|---|---|---|---|---|---|
| 1 | 1 | 1 0 0 1 1 | | | | | |
| 1 | 1 | 1 0 1 0 0 | | | | | |

3. SET STACK POINTER = A8
4. NEW WRITE A7
   4a. SKIPS WRITE 9C - 9F
   4b. SKIPS READ A4 - A7
5. SET STACK POINTER = A7

| | | | | | | | |
|---|---|---|---|---|---|---|---|
| 1 | 1 | 1 0 1 0 0 | | | | | |
| 1 | 1 | 1 0 1 0 0 | | | | | |

6. NEW READ 02
   6a. SKIPS WRITE A0 - A3
   6b. READS 00 - 03 FROM MAIN MEMORY

| | | | | | | | |
|---|---|---|---|---|---|---|---|
| 1 | 1 | 1 0 1 0 0 | | | | | |
| 0 | 1 | 0 0 0 0 0 | | | | | |

METHOD FOR REDUCING ACCESS TO MAIN MEMORY USING A STACK CACHE

CROSS-REFERENCE TO RELATED APPLICATIONS

Priority is claimed from U.S. Provisional Patent Application Ser. No. 60/387,115 filed Jun. 6, 2002, which is incorporated herein by reference in its entirety.

FIELD OF THE INVENTION

The present invention relates generally to microprocessor cache designs. More particularly, the present invention relates to a microprocessor stack cache design, which stores stack elements in an efficient manner.

BACKGROUND OF THE INVENTION

FIG. 1 is a simplified block diagram of a computer system 10. As shown in FIG. 1, the computer system 10 includes a microprocessor 20, a main memory (or backing memory) 30 and a cache 40. In order for a microprocessor to perform its function, data must be obtained from the main memory 30.

In general, the main memory 30 is random access memory (RAM) and is comprised of one or more dynamic random access memory (DRAM) chips. DRAM chips are relatively inexpensive; however, access times are relatively slow for data stored within such chips.

The cache 40 is used to decrease average data access times and, thus, increase system performance. As the microprocessor processes data, the cache 40 is first checked to see if the required data is located therein (due to a previous reading of such data). If it is, a more time-consuming read from the main memory 30 can be avoided. The cache 40 may also be used to reduce the required bandwidth of the main memory 30, since the main memory 30 may be shared with other data access devices.

The cache 40 may include one or more static random access memory (SRAM) chips, which allow for faster data access than DRAM chips. However, for the same memory size, SRAM chips are much more expensive than DRAM chips. Given the competitive pricing structure of computer systems, the number and memory size of SRAM chips that can be included in a computer system is limited.

In designing the structure of caches (e.g., its size), like cache 40, memory access patterns and characteristics of the main memory 30 are considered. Furthermore, attempts are made to reduce the probability that access will be required to the main memory 30, rather than or in addition to the cache 40, when data is written or read. Design depends on two main parameters: spatial locality (i.e., data is statistically close in memory space) and temporal locality (i.e., data is statistically repetitive).

A standard data cache 200 is shown in FIG. 2. Standard data caches are line-based devices having an address tag 210 and a set of control flags 220 (e.g., a valid flag and a dirty flag, as will be described in further detail below) per line. Each line stores a fixed, usually binary, number of data bytes 230 (e.g., 8 bytes in FIG. 2) that is usually addressed by a least significant portion of the memory address. The tag usually contains the most significant portion of the memory address, and any remaining middle portion (e.g., an index, which is not shown) of the address maps to a set of lines.

In designing the cache structure, a designer must choose a number of data bytes per line (usually a binary value), a number of lines (usually a binary value) and the manner in which multiple lines in the memory space map to the same line of the cache (called set associativity).

When a memory read occurs (i.e., data is to be provided to the microprocessor), the cache 40 is checked for a match. If a match occurs (called a read hit), data is read from the faster cache 40, rather than from the slower main memory 30. A read miss occurs if there is no match in the cache 40 during the memory read. For a read miss, an entire cache line's worth of data must be read from the slower main memory 30 and copied into the appropriate place in the cache 40 (e.g., one of the lines 0–3). Near-term microprocessor reads will hopefully find this data 40 in the cache for future read hits.

A memory write occurs when data located in the microprocessor is to be written to memory. There are many types of write policies that may be employed. Three types of write policies are discussed herein.

For example, when data is written only to main memory 30 and not via the cache 40, this is called a write-around cache. As another example, data in the cache 40 may be written at the time of writing to the main memory 30. This is known as a write-through cache. When using a write-through cache, the cache 40 is checked for valid matching addresses, and a match is called a write hit and a non-match is called a write miss. A write miss forces a read of the data line from main memory 30 into the appropriate place in cache 40 before the microprocessor write into the cache can be completed.

According to another write policy, microprocessor writes directly affect only the cache 40. This is known as a write-back cache. Write misses force a read of the data line into the cache 40 before the microprocessor write can occur. A dirty control flag per line is used to indicate if any writes have occurred since the line was read into the cache. Previously-written data lines (i.e., those with a set dirty flag) must first be copied to main memory 30 before they can be overwritten with new data from a different place in main memory. Thus, main memory updates are delayed from the time of a microprocessor write until a line replacement operation occurs.

Whether to use a write-around, write-through or write-back cache is a matter of design choice and is dependent upon the desired policy.

When data is read from the main memory 30 and stored in the cache 40, an entire data line is read to speed up future reads to data and neighboring data within its line. However, before data can be stored in the cache, a candidate line (e.g., one of lines 0, 1, 2 or 3 shown in FIG. 2) must be selected. If the cache has the simplest set associativity (called direct mapping), then the middle portion of the address directly selects the only candidate line. On the other hand, if the cache has multiple-set associativity, then an algorithm must be used to select a line from the possible set of lines. One common algorithm is least recently used, or LRU.

If a write-around or write-through cache is implemented, then the candidate line can be replaced immediately with the newly-read data because the data in the candidate line will always match data stored in the main memory 30. However, if a write-back cache is being used, then there is a possibility, due to microprocessor writes, that the candidate line does not match the data stored in the main memory 30. Accordingly, the candidate line's dirty flag 220 must be checked before replacement may occur. If the processor had not written any byte in the candidate line, then the dirty flag 220 would be false and the candidate line can be replaced immediately. To the contrary, if any byte in the line had been written, then the dirty flag 220 would be true (would have been set) and the candidate line must first be written to the main memory 30, before it can be replaced with the newly read data.

Data caches may take a variety of forms. In most processor memory systems, a standard data cache is all that is used for average data access time improvement. In some instances, however, a stack cache may be used in an effort to benefit from the inherent differences between stack memory accesses and other types of data memory accesses.

Stack memory objects differ from normal data elements because they reside within a predefined address range between a stack ceiling value and a stack floor value. A current stack pointer value helps to distinguish between an object located in the stack and other objects. By convention, all stack objects are written before they are ever read.

A normal data cache ignores these differences, yet the differences can be utilized by more specific memory structures. In an effort to improve performance of processor memory systems, a variety of other memory structures may be used. For example, some systems may employ a specialized stack structure such as a circular queue, in conjunction with, or instead of, a normal data cache. The circular queue can be used for caching the top-of-stack memory elements, thereby taking advantage of the unique temporal and spatial locality of a stack.

Circular queues, however, have a large disadvantage over a normal data cache for a multi-stack system. Specifically, each time that the stack is swapped, the top-of-stack boundary changes dramatically and, thus, the cache has almost no valid data. In a multi-tasking system where stack changes occur frequently, this disadvantage can more than outweigh any advantages derived from better locality of reference. This disparity increases as the size of the queue increases. Furthermore, another disadvantage is that the stack queue cache typically cannot be used for non-stack data caching.

A normal data cache does improve the average access time for stack objects; however, it does not take advantage of the inherent access pattern differences from normal data objects. In contrast to circular queues, multiple stacks are easily supported in a normal data cache, as each line can have a part of any stack and no line swapping is required other than those from line mapping conflicts. If the stacks are located in memory carefully, then the inherent cache conflicts due to line mapping can be reduced. One real disadvantage of using a normal data cache for stack object storage is that excessive accesses to main memory 30 (or backing memory) are required. Thus, average data access times are increased.

A write-back cache usually provides better performance for stack accesses, as each object is read relatively soon after it is written and stack objects are always written before they are read. When a stack object is deleted through a pop read operation, a normal data cache still leaves the line in the cache valid. When a line replacement operation occurs, the candidate line is dirty and valid. This candidate line must first be written to the main memory before it can be replaced. If all of the candidate line contains only deleted objects, then the write operation to main memory is a waste.

Another wasted operation is due to object-creation writes. When a write miss occurs, the line fill operation to create a valid line for the write will typically be reading from a currently-unused area of the stack. The main memory read operation will then be a waste.

Typically, these wasted accesses to the main memory cannot be avoided, as no processor indication of push or pop is given. Also, the current stack pointer is not provided to the cache for address range comparison.

U.S. Pat. No. 6,151,661 (which is incorporated herein by reference) discloses a method of using a pop signal to invalidate a line if the last object is deleted from that line. Also, read misses from pops do not cause a line replacement in the cache (i.e., the cache is bypassed) if an object would be the first object created on a line. While this cache structure does improve on pushes and pops that cross line boundaries in the cache, it requires a pop signal from the instruction decoder within the processor. Furthermore, no further improvement for pushes is obtained.

Accordingly, it would be desirable to develop a cache structure which improves average data access times. Furthermore, it would be desirable to develop a cache structure that is specifically geared for multi-stack performance, yet can be shared with non-stack data accesses.

SUMMARY OF THE INVENTION

The present invention is designed to meet the aforementioned, and other, needs. The invention is directed to efficient stack cache logic, which reduces the number of accesses to main memory.

More specifically, in one embodiment, the invention prevents writing old line data to main memory when the old line data represents a currently unused area of the cache. In another embodiment, the invention further prevents reading previous line data for a new tag from main memory when the new tag represents a currently unused area of the cache.

Other embodiments, objects, features and advantages of the invention will be apparent from the following specification taken in conjunction with the following drawings.

BRIEF DESCRIPTION OF THE DRAWINGS

FIG. 6 is an example sequence of cache operation.

DETAILED DESCRIPTION OF THE PREFERRED EMBODIMENT

Figure 1:
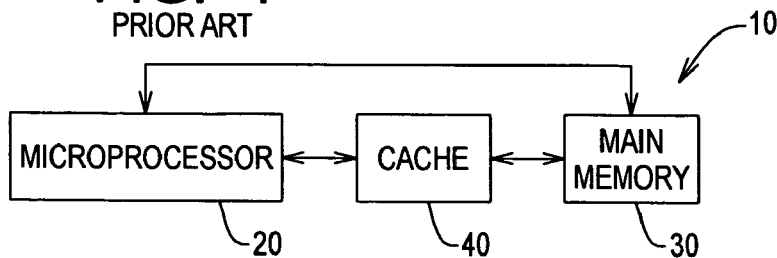
FIG. 1 is a simplified block diagram of a computer system.
Figure 2:
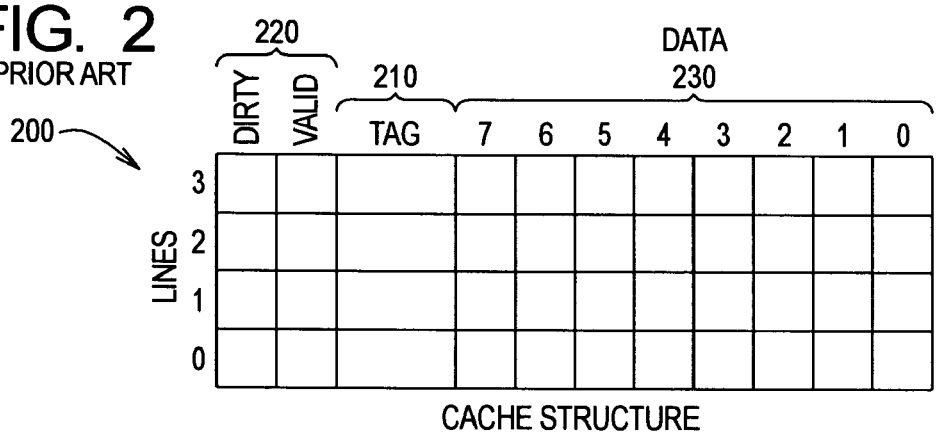
FIG. 2 is a simplified diagrammatic representation of a standard data cache.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention is directed to a stack cache. Specifically, the stack cache includes a normal data cache that is enhanced with a stack-oriented miss algorithm. The stack cache is geared for multi-stack performance, yet can be shared with non-stack data accesses. Supported stack accesses include pushes, pops, normal reads and normal writes. The only information required from the processor, in addition to the memory bus, is the current stack pointer value.

Figure 3:
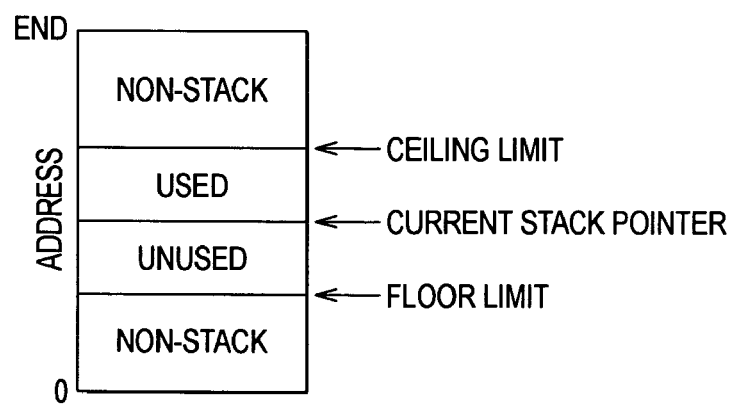
FIG. 3 is a simplified diagrammatic representation of the main memory sub-spaces related to a stack.

More specifically, a write-back, line-oriented, stack cache structure is used. The cache structure includes both a single dirty flag and one address tag per line. Any amount of set associativity can be used. The algorithm does replacement-line candidate selection. Each stack space supported is preferably an integer number of cache lines in size. A single control register is added to the cache, where the control register contains the current stack maximum limit (e.g., floor limit in FIG. 3). Preferably, this register is written before any stack accesses are performed. By definition, the unused area of the current stack is defined as the range of memory addresses between the current stack pointer (i.e., current pointer in FIG. 3) and the maximum limit value. An optional second control register may be added containing the current stack minimum limit (e.g., ceiling limit in FIG. 3), which allows for out of bounds checking on both ends of the stack memory range. FIG. 3 shows the main memory sub-spaces as described above.

Figure 4:
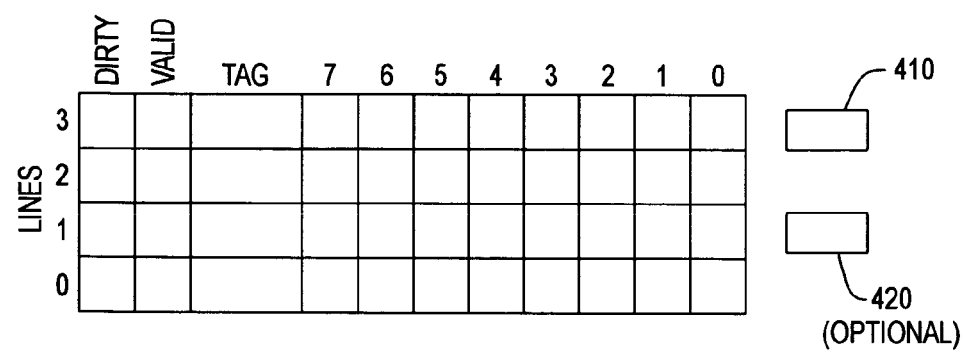
FIG. 4 is a simplified diagrammatic representation of a cache which includes a first control register and an optional second control register, both of which may be used in conjunction with the present invention.

FIG. 4 is a simplified diagrammatic representation of a cache which includes a first control register 410 and an optional second control register 420, both of which may be used in conjunction with the present invention. The cache initializes to a state where each line's valid flag is cleared, indicating that no valid data exists within that line of the cache. Special control operations of the cache, outside the scope of normal operation, may invalidate some or all of the cache by clearing valid flags. The valid flag of a line must be set for a read or write hit to occur on that line.

Cache hits for read and write accesses proceed as normal for a standard write-back data cache. However, the new algorithm of the present invention is invoked when a cache miss occurs. Specifically, the new algorithm combines read and write misses with an address range comparison of the current stack pointer, the limit register value and the candidate line's old tag value. By virtue of knowing when an access was or will be to the unused portion of a stack, the algorithm reduces writes and reads to main memory.

For purposes of illustration, a memory system is shown in FIG. 3, which uses a downward-growing stack. (As will be understood by those skilled in the art, an upward-growing stack may also be used.) The stack pointer indicates the location of the last-written object defining the extent of the current stack. The floor limit register is loaded with the lowest address that can contain an object in the current stack. A line in the cache is assumed to contain at least two bytes. By definition, addresses of the unused portion of the stack fit the following equation:

unused=(tag<stack pointer) and (tag≧limit)

Figure 5:
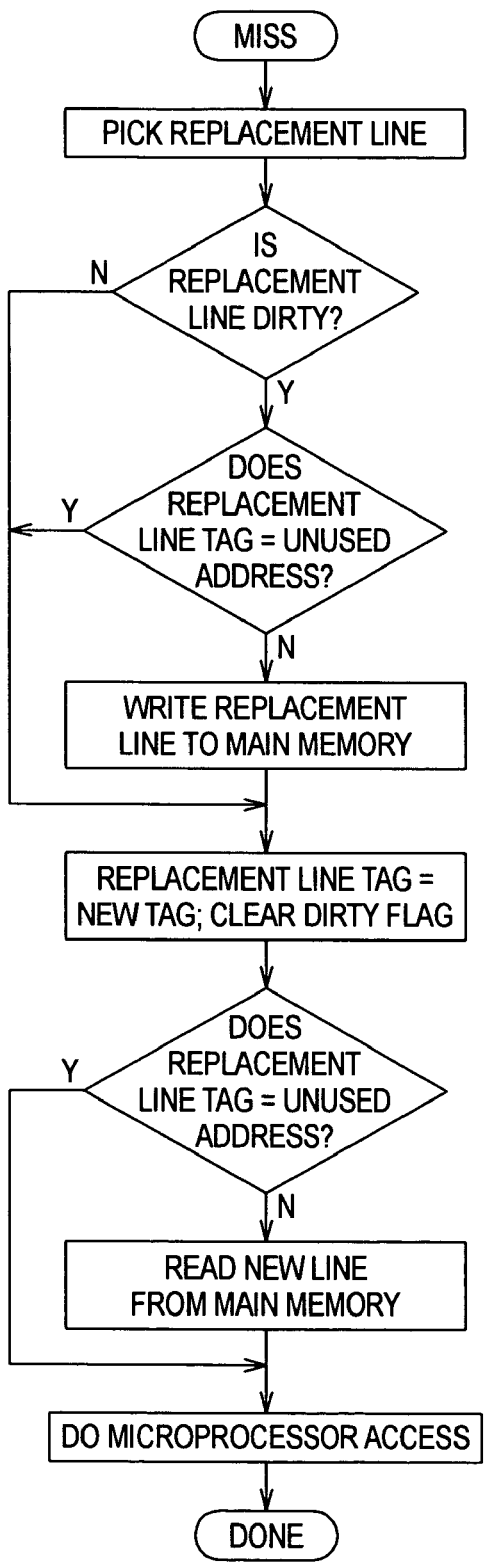
FIG. 5 is a flowchart of the line replacement algorithm for a miss in accordance with one embodiment of the present invention.

The miss algorithm is described in the following pseudo-code:

if (read miss or write miss) then
    pick replacement line candidate
    if (dirty and (unused=false))/* old tag value*/
      write old line data to backing memory
    line tag=new tag; clear dirty flag
    if (unused=false)/*new tag value*/
      read previous data in new line from backing memory
    read data from or write data to cache line FIG. 5 shows a flow chart of the above algorithm.

The described invention prevents writing old line data to backing memory when it represents a currently unused area of the cache (i.e., previously-deleted objects). The algorithm also prevents reading previous line data for the new tag from backing memory when it represents a currently unused area of the cache.

FIG. 6 shows an example sequence of operation for a direct-mapped, two-line, four-bytes-per-line stack cache. All addresses in the example are 8-bit hexadecimal numbers unless noted otherwise. The main memory addresses are delimited as 80-BF for holding the current stack, with 00-7F and C0-FF holding non-stack objects. The current stack pointer is A0. The two-line cache currently holds two dirty lines of data: addresses 04–07 (non-stack) and A0–A3 (bottom of stack).

The first processor operation is a stack-growth write to address 9F (for a downward growing stack shown in FIG. 6), which begins by writing to that address and then setting the stack pointer to 9F. The cache logic determines that this write is a miss by virtue of its tag value, binary 10011, and index value, binary 1, not matching line 1. The miss begins the line replacement algorithm of FIG. 5. This line is dirty and the old tag value of binary 00000, corresponding to addresses 04–07, does not point to the unused section of the stack. This forces a write of the non-stack data of addresses 04–07 from the cache to the main memory. The new tag corresponding to addresses 9C–9F is stored in the cache and the dirty flag is cleared. This new tag value corresponds to the unused section of the stack so the read of the line from main memory is skipped. The processor write then proceeds and the dirty flag is set.

The next processor operation is a deletion of a group of stack objects achieved by changing the stack pointer to A8. No cache functions occur.

The next processor operation is a stack-growth write to address A7, which begins by writing to that address and then setting the stack pointer to A7. The cache logic determines that this write is a miss by virtue of its tag value, binary 10100, and index value, binary 1, not matching line 1. The replacement algorithm finds that line 1 is dirty and has an old tag value of binary 10011. This old tag value corresponds to addresses 9C–9F, which are in the unused section of the cache. The algorithm skips the write of the old data line, sets the line 1 tag to the new value, and clears the dirty flag. The new tag value corresponds to the unused section of the stack so the read of the line from main memory is skipped. The processor write then proceeds and the dirty flag is set.

The next processor operation is a read of address 02, which the cache detects as a read miss from line 0 by virtue of its tag value, binary 00000, and index value, binary 0. The replacement algorithm finds that line 0 is dirty and has an old tag value of binary 10100. This old tag value corresponds to addresses A0–A3, which are in the unused section of the cache. The algorithm skips the write of the old data line, sets line 0 tag to the new value, and clears the dirty flag. The new tag value does not correspond to the unused section of the stack so the addresses 00–03 are read from main memory into the cache.

The cache operation allows for single and multiple-object deletion by changing the stack pointer, for quick multiple object deletion. No special push or pop indications are required and, if used, such indications would prevent optimization for multiple-object deletion. Further, multiple-object creation through a stack pointer is inherently supported with the described cache.

Advantageously, all cache optimizations with respect to size, set associativity and replacement candidate selection are allowed, with no impact to stack access improvements. Additionally, cache miss time (and the backing memory access bandwidth required) is reduced by fully taking advantage of cache address range comparisons, while requiring the least change to the processor operation. Another advantage is that the current stack pointer is a standard processor register and its value can easily be routed from a location internal to the processor to the cache control logic.

Furthermore, no time penalty is incurred in the cache hit detection circuitry, which is usually the limiting factor in the cache operational frequency. Upon study of the present invention those skilled in the art may argue that one possible lengthy addition to cache operation is located in the address range comparison for unused data detection. However, the inventors have determined that this range comparison time may be hidden in the cache control operation and adds no visible delay to miss times.

As mentioned above, the stack cache easily supports multiple stacks. The only processor action that is required on a stack swap is to change the limit register to the new value before accessing any locations within the new stack.

Non-stack data accesses are inherently supported within the same cache. Valid stack areas and valid non-stack areas are treated equally in the address range comparisons (i.e., only unused portions within the stack match the comparison). The tradeoff of mixing stack and non-stack data in a single cache is the same as when using a normal cache, namely, additional line conflicts and replacements will most likely occur.

Unlike prior systems, the present invention uses a stack pointer for address comparison with the old and new tag values. These address comparisons are the key to optimally deciding when to write or read old data between the cache and backing memory.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
providing a processor;
providing a main memory associated with the processor;
providing a stack cache associated with the processor, the stack cache including a stack pointer associated with a stack and a stack limit register, the stack cache further including a plurality of candidate lines each having a dirty flag, a valid flag, an address tag and a plurality of data bytes;
determining whether to access the main memory based upon whether the access was or will be to an unused portion of the stack.

2. A method comprising the steps of:
providing a processor;
providing a main memory associated with the processor;
providing a stack cache associated with the processor, the stack cache including a stack having a stack pointer with a stack pointer value and a stack limit register having a stack limit value, the stack cache further including a plurality of candidate lines each having a dirty flag, a valid flag, an address tag and a plurality of data bytes;
choosing a replacement line upon detection of a cache miss; and,
writing the plurality of data bytes to the main memory, if the dirty flag of the chosen candidate line indicates that a change to one or more of the plurality of data bytes has occurred and the address tag value of the candidate line is not in an unused portion of the stack.

3. The method of claim 2, wherein an unused portion of the stack is defined as addresses which have an address tag value less than the stack pointer value and an address tag value greater than or equal to the stack limit value.

4. The method of claim 3 further comprising the step of:
replacing the address tag value of the chosen candidate line with a new address tag value associated with a new line of data and clearing the dirty flag of the chosen candidate line;
reading data associated with the new address tag from main memory, if the new address tag value is not less than the value of the stack pointer and the new address tag value is not greater than or equal to the stack limit value.

5. The method of claim 4 including the step of:
reading data from or writing data to the candidate line using the processor.

6. The method of claim 2, wherein the stack cache is a write-back stack cache.

7. The method of claim 2, wherein the stack cache includes multiple stacks.

8. The method of claim 7, wherein each of the multiple stacks includes a corresponding stack limit value.

9. The method of claim 8, further comprising the step of:
loading the corresponding stack limit value into the stack limit register prior to determining whether an address tag value is in the unused portion of one of the multiple stacks.

10. The method of claim 2, further including a second stack limit register having a second stack limit value which corresponds to an upper stack address limit.

11. The method of claim 10, wherein a difference between the second stack limit value and the stack limit value, when divided by the number of cache lines, equals an integer number.

12. The method of claim 11, wherein the stack cache includes non-stack data.

13. The method of claim 2, wherein an unused portion of the stack is defined as addresses which have an address tag value greater than the stack pointer value and an address tag value less than or equal to the stack limit value.

14. The method of claim 13 further comprising the step of:
replacing the address tag value of the chosen candidate line with a new address tag value associated with a new line of data and clearing the dirty flag of the chosen candidate line;
reading data associated with new address tag from main memory, if the new address tag value is not greater than the value of the stack pointer and the new address tag value is not less than or equal to the stack limit value.

15. The method of claim 14, wherein the stack cache is a write-back stack cache.

16. The method of claim 2, wherein an unused portion of the stack includes addresses which have an address tag value between the stack pointer value and the stack limit value.

17. The method of claim 16 further comprising the step of:
replacing the address tag value of the chosen candidate line with a new address tag value associated with a new line of data and clearing the dirty flag of the chosen candidate line;
reading data associated with new address tag from main memory, if the new address tag value is not between the value of the stack pointer and the stack limit value.

18. The method of claim 17, wherein the stack cache is a write-back stack cache.

19. A method comprising the steps of:
providing a processor;
providing a main memory associated with the processor;
providing a stack cache associated with the processor, the stack cache including a stack having a stack pointer with a stack pointer value, the stack cache further including a plurality of candidate lines each having an address tag and a plurality of data bytes; and,
determining whether to write or read data between the cache and the main memory by comparing the stack pointer value with an address tag value.

20. The method of claim 19, wherein the stack includes a stack limit register having a stack limit value and wherein a comparison is also made between the address tag value and the stack limit value in said determining step.

* * * * *